US009899867B2

(12) United States Patent
Brhlik et al.

(10) Patent No.: US 9,899,867 B2
(45) Date of Patent: Feb. 20, 2018

(54) DC POWER SERVER FOR A DC MICROGRID

(71) Applicant: Robert Bosch GmbH, Stuttgart (DE)

(72) Inventors: Dusan Brhlik, Cornelius, NC (US); John Saussele, Davidson, NC (US); Daniel Fregosi, Mooresville, NC (US)

(73) Assignee: Robert Bosch GmbH, Stuttgart (DE)

( * ) Notice: Subject to any disclaimer, the term of this patent is extended or adjusted under 35 U.S.C. 154(b) by 413 days.

(21) Appl. No.: 14/640,087

(22) Filed: Mar. 6, 2015

(65) Prior Publication Data
US 2015/0256025 A1    Sep. 10, 2015

Related U.S. Application Data

(60) Provisional application No. 61/948,927, filed on Mar. 6, 2014.

(51) Int. Cl.
| H02J 1/12 | (2006.01) |
| H02J 7/34 | (2006.01) |
| H02J 3/28 | (2006.01) |

(52) U.S. Cl.
CPC .................. *H02J 7/34* (2013.01); *H02J 1/12* (2013.01); *H02J 3/28* (2013.01); *Y10T 307/328* (2015.04)

(58) Field of Classification Search
CPC ................... H02J 7/34; H02J 1/12; H02J 3/28
USPC ........................................................ 307/21
See application file for complete search history.

(56) References Cited

U.S. PATENT DOCUMENTS

| 8,373,303 B1 | 2/2013 | Daniels |
| 8,680,838 B2 | 3/2014 | Saussele |
| 2011/0057577 A1* | 3/2011 | Otake ................ H05B 33/0803 315/291 |
| 2011/0089759 A1* | 4/2011 | Pan ............................ H02J 3/02 307/25 |
| 2011/0121647 A1* | 5/2011 | Ragavanis ................ H02J 1/06 307/19 |
| 2011/0121648 A1* | 5/2011 | Pan ............................ H02J 3/14 307/26 |
| 2011/0148195 A1* | 6/2011 | Lee ............................ H02J 7/35 307/25 |
| 2012/0047386 A1* | 2/2012 | Matsui ................ H01M 10/465 713/340 |

(Continued)

FOREIGN PATENT DOCUMENTS

| WO | 2009155445 A2 | 12/2009 |
| WO | 2013046244 A2 | 4/2013 |
| WO | 2014/027246 A2 | 2/2014 |

OTHER PUBLICATIONS

International Search Report and Written Opinion corresponding to PCT Application No. PCT/US2015/019144, dated May 29, 2015 (11 pages).

*Primary Examiner* — Ryan Jager
(74) *Attorney, Agent, or Firm* — Maginot Moore & Beck LLP (57) ABSTRACT

A direct current power server configured to serve a direct current microgrid of a building. The direct current power server includes a direct current bus having branch circuits that extend from the direct current power server to provide direct current power to direct current loads of the building. The direct current power server directly integrates a local energy source and local energy storage into the direct current microgrid without attachment to the alternating current electrical grid.

20 Claims, 6 Drawing Sheets

(56) References Cited

U.S. PATENT DOCUMENTS

| | | | |
|---|---|---|---|
| 2012/0049634 A1 | 3/2012 | Babb | |
| 2012/0267952 A1* | 10/2012 | Ballatine | H02J 1/102 307/26 |
| 2012/0299386 A1* | 11/2012 | Kaufman | H02J 1/12 307/82 |
| 2012/0319495 A1* | 12/2012 | Muller | H02J 3/383 307/82 |
| 2013/0041516 A1 | 2/2013 | Rockenfeller et al. | |
| 2013/0044522 A1 | 2/2013 | Anghel | |
| 2014/0176026 A1 | 6/2014 | Saussele | |
| 2015/0069932 A1* | 3/2015 | Grajcar | H05B 33/083 315/297 |
| 2015/0333512 A1* | 11/2015 | Saussele | H02S 10/20 700/287 |
| 2017/0102726 A1* | 4/2017 | Goldsmith | G05F 1/66 |
| 2017/0110880 A1* | 4/2017 | Chen | H02M 7/04 |

\* cited by examiner

DC POWER SERVER FOR A DC MICROGRID

CLAIM OF PRIORITY

This application claims priority to U.S. Provisional Application No. 61/948,927, which is entitled "DC Power Server" and was filed on Mar. 6, 2014, the entire contents of which are hereby incorporated by reference herein.

BACKGROUND

The device disclosed in this document relates to direct-current microgrids and, more particularly, to a direct-current power server for a direct-current microgrid.

A power distribution system in a commercial building is responsible for safely distributing electrical power to loads throughout the building. A typical power distribution system consists of components such as metering devices, protective devices (over-current, over-voltage, over-power, etc.), switching devices, transformers, controllers, and conductors. Within a typical commercial building, alternating-current (AC) power is distributed to loads through switchboards or panelboards. A panelboard is an enclosure for overcurrent protection devices for the busses and branch circuits that distribute power to building loads or their associated circuits, as defined in the National Electric Code. Power to lighting in a commercial building is commonly distributed through dedicated panelboards and power flow to the lighting is controlled by overcurrent protection devices on the corresponding branch circuits. Lighting panelboards are often wall mounted and their physical size and capacity ratings are standardized within the industry.

As renewable energy technology advances, many commercial building owners or lessees are considering deployment of renewable energy assets. However, large-scale deployment of distributed renewable energy will be achieved only when the renewable energy assets provide attractive returns to their owners, while also allowing utilities and grid operators to safely and reliably mitigate the impacts of intermittency on the power distribution infrastructure. Current systems for retrofitting a commercial building's power distribution system to utilize renewably energy assets have several disadvantages.

Figure 1:
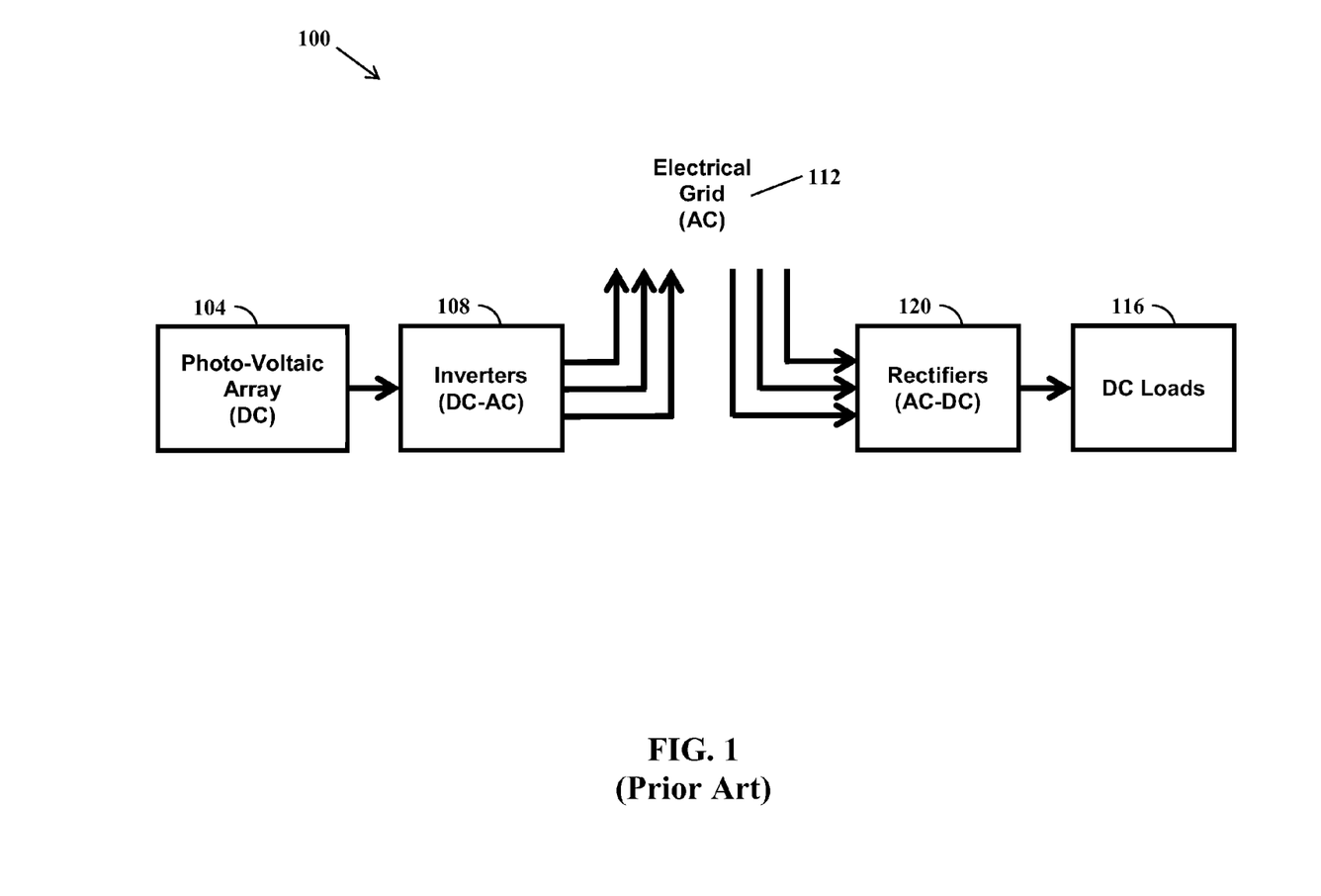
FIG. 1 illustrates a typical system for integrating an on-site PV system into a building's power distribution system.

FIG. 1 shows a typical system 100 for integrating an on-site photo-voltaic (PV) system into a building's power distribution system. A PV array 104 is provided on-site to generate power for the building. The PV array 104 may, for example, be situated on the roof of the building. The PV array 104 generates a varying amount of direct-current (DC) power, depending on the time of day and weather. The PV array 104 is connected to an inverter 108, which converts the DC power to AC power. The inverter 108 is connected to the AC electrical grid 112 via the building's switchboard or panelboard. The building's power distribution system draws AC power directly from electrical grid 112. In order for the building's power distribution system to provide power to DC loads 116, the AC power drawn from the electrical grid 112 must be converted to DC power. Rectifiers 120 must be connected between the DC loads 116 and the building's power distribution system in order to provide DC power to the DC loads 116.

The system 100 has inefficiencies that cause the system 100 to be less cost-effective and, therefore, less attractive to building owners. The inverter 108 typically has conversion losses of around 3%-8%. These conversion losses can be even higher, depending on the design of the inverter 108 and on operating conditions, such as the weather. The inverter 108 also has increased losses when operating a partial capacity, such as at times of day during which less sunlight shines on the PV array 104. Additionally, as DC loads 116 become more prevalent in commercial buildings, conversion losses associated with the rectifiers 120 become increasingly relevant. Common DC loads in commercial buildings include solid state LED lighting, fluorescent lighting, IT equipment, electric vehicle chargers, DC motors, and motors with variable frequency drives (VFDs). Typical rectification losses for these loads range between 4%-25%. The conversions from DC to AC and from AC back to DC for powering DC loads results in a considerable reduction in the total amount of PV energy that is actually utilized by the building. In addition, the reliability of the system is reduced through the extra electronics required for DC to AC and AC to DC energy conversions.

The system 100 also cannot provide any power from the PV array 104 to the building during a power outage on the electrical grid 112. Since the PV array 104 is not directly connected to the building's power distribution system, electrical grid 112 is effectively in the path between the PV array 104 and the building loads. To enable delivery of on-site renewable energy to critical loads during grid outages, stationary energy storage devices having sophisticated grid-forming inverters and transfer switches must be provided in AC-based system 100 to operate the building's power distribution system and utilize the PV array 104 in an islanded mode.

Since the PV array 104 of the system 100 is tied directly to the electrical grid 112, the system 100 may be subject certain regulatory requirements and the building owner must obtain permission from the utility company that operates the electrical grid 112 before operating the system 100. Generally, the building owner must acquire an interconnection agreement with the utility company, which may subject the building owner to certain fees and other expenses.

What is needed is a power server that integrates renewable energy assets into a building's power distribution system, allowing the most efficient transfer of energy from sources to loads without direct connection to the electrical grid, such that the renewable energy assets can provide power to the building in isolation from the electrical grid.

SUMMARY

A DC power server has been developed to integrate renewable energy assets into a DC microgrid of a building. The DC power server includes: an enclosure; a direct current bus disposed within the enclosure, the direct current bus having at least one branch circuit that extends from the enclosure and connects with direct current loads of the building to provide direct current power to the direct current loads; an electrical grid connection configured to connect to an electrical grid and to receive alternating current power from the electrical grid; a rectifier circuit disposed within the enclosure and connected between the electrical grid connection and the direct current bus, the rectifier circuit being configured to provide direct current power to the direct current bus by converting the alternating current power from the electrical grid connection to direct current power; an energy source connection configured to connect to an energy source and to receive direct current power from the energy source, the energy source connection being connected to the direct current bus to provide the direct current power from the energy source to the direct current bus; and a system controller configured to control power flow from the electrical grid and the energy source to the direct current bus.

A power distribution system has been developed to integrate renewable energy assets into a DC microgrid of a building. The power distribution system includes a first energy source; a first group of direct current loads of the building; and a first direct current power server connected between the first energy source and the first group of direct current loads. The first direct current power server includes: an enclosure; a direct current bus disposed within the enclosure, the direct current bus having at least one branch circuit that extends from the enclosure and connects with the first group of direct current loads to provide direct current power to the first group of direct current loads; an electrical grid connection configured to connect to an electrical grid and to receive alternating current power from the electrical grid; a rectifier circuit disposed within the enclosure and connected between the electrical grid connection and the direct current bus, the rectifier circuit being configured to provide direct current power to the direct current bus by converting the alternating current power from the electrical grid connection to direct current power; an energy source connection configured to connect to the first energy source and to receive direct current power from the first energy source, the energy source connection being connected to the direct current bus to provide the direct current power from the first energy source to the direct current bus; and a system controller configured to control power flow from the electrical grid and the first energy source to the direct current bus.

BRIEF DESCRIPTION OF THE DRAWINGS

The foregoing aspects and other features of the DC power server are explained in the following description, taken in connection with the accompanying drawings.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Figure 2:
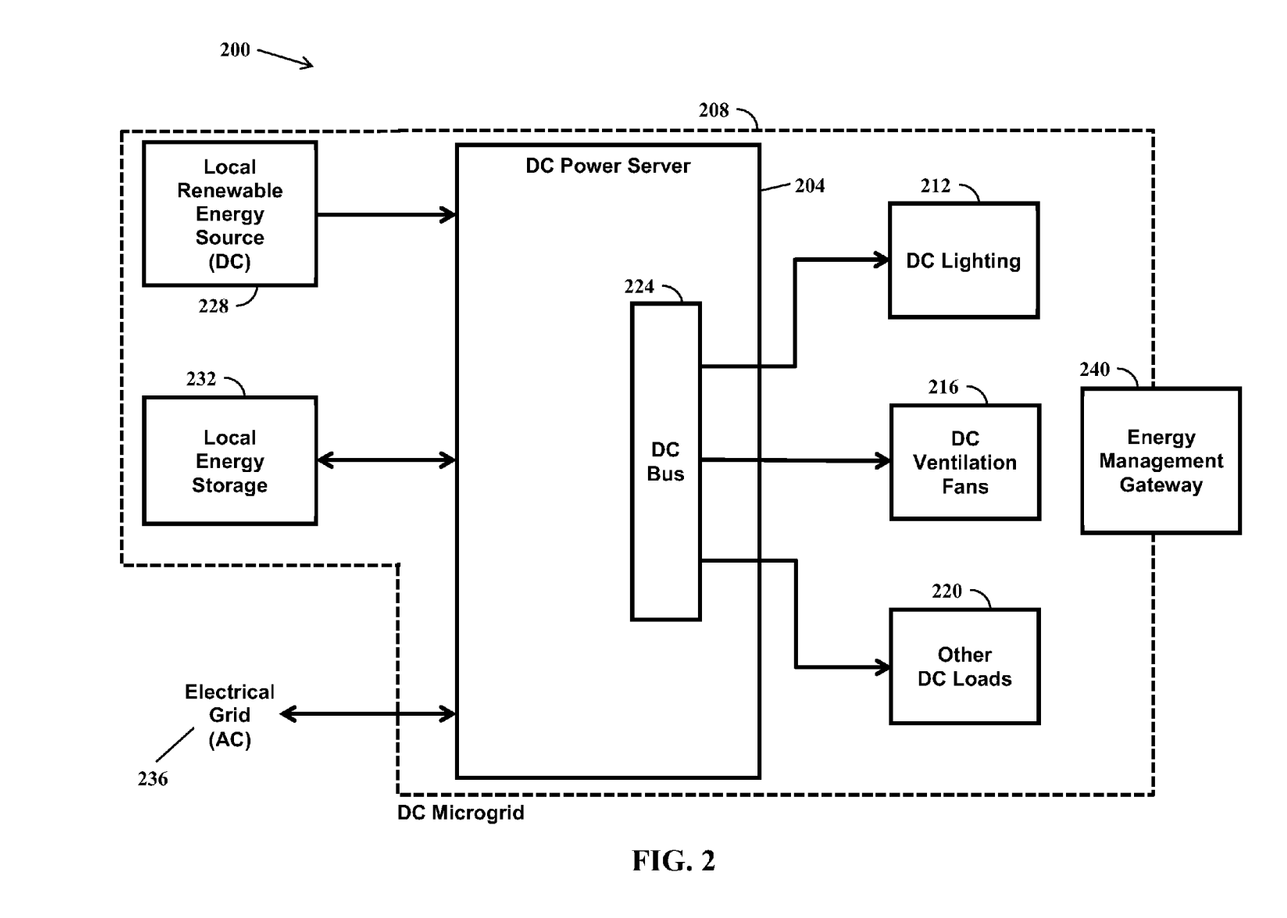
FIG. 2 illustrates a power distribution system having a DC power server.

FIG. 2 shows a power distribution system 200 having a DC power server 204. The DC power server 204 is configured to establish a DC microgrid 208 for distribution of DC power to DC loads of a building. In some embodiments, the DC loads include DC lighting 212, DC ventilation fans 216, and other DC loads 220. The DC lighting 212 includes solid state LED lighting or any other lighting technology that operates with DC power. In one embodiment, the DC ventilation fans 216 include large industrial ceiling fans that operate with DC power. In some embodiments, the other DC loads 220 include electric vehicle chargers, such as fork-lift chargers, DC motors, and motors with variable frequency drives (VFDs).

A DC bus 224 of the DC microgrid 208 distributes DC power to the DC loads of the building, including the DC lighting 212, the DC ventilation fans 216, and the other DC loads 220. In some embodiments, the DC bus 224 has a nominal voltage of 380 Volts. In one embodiment, the DC bus 224 is configured with a High Resistance Midpoint Ground (HRMG). In the event of a ground fault, midpoint grounding resistors limit the amount of current that can flow to ground through the faulting device to safe levels.

In some embodiments, emergency DC loads are connected directly to the DC bus 224. In one embodiment, the DC lighting 212 is an emergency DC load. Other non-emergency DC loads are connected via a supplemental DC bus. The supplemental DC bus is selectively connected and disconnected from the DC bus 224 via a connection means, such as a contactor. This embodiment is described in further detailed with respect to FIG. 4 below.

The DC power server 204 is configured to combine multiple energy sources to provide power to the DC microgrid 208. A local renewable energy source 228 is connected to the DC power server 204 to provide DC power to the DC microgrid 208. In some embodiments, the local renewable energy source 228 is an on-site PV array configured to generate DC power for the building. In other embodiments, the local renewable energy source 228 includes on-site wind or hydro systems configured to generate DC power. Further embodiments include non-renewable energy sources such as gas or fuel cell system configured to generate DC power. Local energy storage 232 is also connected to the DC power server 204 to provide power to and store energy from the DC microgrid 208. In one embodiment, the local energy storage 232 is an on-site battery system. In another embodiment, the local energy storage 232 is a small battery included inside the enclosure of the DC power server 204. The DC power server 204 is further connected to an electrical grid 236 from which the DC power server 204 draws AC power. The DC power server 204 is configured to convert the AC power drawn from the electrical grid to DC power for the DC microgrid 208. In some embodiments, the DC power server 204 is also configured to export power to the electrical grid 236 by converting any of the DC sources of power to AC power.

The system 200 further includes an energy management gateway 240. The energy management gateway 240 is responsible for managing power production of the local renewable energy source 228, power distribution to the DC loads on the DC microgrid 208, charge and discharge of the local energy storage 232, and utilization of power from the electrical grid 236. In one embodiment, the energy management gateway 240 is configured to utilize the local renewable energy source 228 and the local energy storage 232 to enable peak load reduction, demand charge reduction, load shifting, and demand response participation. In one embodiment, the energy management gateway 240 communicates with the DC power server 204 to set the optimum voltage of the DC bus 224.

Unlike the typical system 100, the system 200 is configured to utilize power generated by the local renewable energy source 228 even in the event of an outage on the electrical grid 236. Since the local renewable energy source 228 is not directly connected to the electrical grid 236, the local renewable energy source 228 remains operable during an outage on the electrical grid 236. In event of such an outage, the DC power server is configured to isolate the system 200 from the electrical grid 236. The system 200 utilizes the local renewable energy source 228 and the local energy storage 232 to operate in an island mode and continues to provide power to some or all of the DC loads on the DC microgrid 208. Additionally, by isolating the system 200 from the electrical grid, the system 200 does not risk injury to utility workers as they make necessary repairs to the electrical grid 236 to resolve the outage.

To further enhance the energy security of the system 200, when operating during an outage on the electrical grid 236, the power server 204 or the energy management gateway 240 can dictate the operating state of the DC loads or the DC microgrid 208 to maximize the amount of time the system 200 can operate without drawing AC power from the electrical grid 236. In one embodiment, when operating in an island mode during an outage on the electrical grid 236, the power server 204 is configured to operate the one or more of the DC loads on the DC microgrid 208 at reduced operating levels. If the power is available from the local renewable energy source 228, the DC power server 204 is configured to prioritize use of power from the local renewable energy source 228 over use of power from the local energy storage 232. In another embodiment, this strategy may be utilized to provided required emergency lighting for the building.

Since the DC power server 204 isolates the DC microgrid 208 from the electrical grid 236, it is possible for devices on the DC microgrid 208 to reliably communicate over the DC bus 224. In some embodiments, the DC power server 204 is configured to use power line communication techniques to communicate with DC loads on the DC bus 224, the local renewable energy source 228, the local energy storage 232, or other DC power servers. In one embodiment, the DC power server 204 is configured to control the operating state of DC loads on the DC bus 224. In further embodiments, the DC power server 204 is configured to monitor the DC loads on the DC bus 224 by communicating with sensors connect to the DC loads or with sensors otherwise attached to the DC bus 224. In one embodiment, the DC power server 204 is configured to visually communicate a system failure or other operating condition to occupants of the building by controlling an operating state of a DC load, such as by controlling the DC lighting 212 so that one or more lights flash or dim. Additionally, in some embodiments, some DC loads on the DC bus 224 are configured to communicate with one another. By communicating using power line communication techniques on the DC bus 224, the need for extra networking equipment, control wires, wireless interfaces is eliminated. In one embodiment, the other DC loads 220 include a networking device that is connected to the Internet to enable the DC loads on the DC bus 224 to communicate over the Internet. Particularly, DC loads on the DC bus 224 communicate with the networking device using power line communication techniques and the networking device routes the communications to the Internet.

The system 200 is easily retrofitted into an existing power distribution system of a building. Existing buildings are typically served by three-phase AC power. However, many commercial lights operate on single-phase AC power. In some existing buildings, separate circuit branches exist to serve AC lighting in different areas of the building. It is common to distribute and balance the single-phase AC lighting across the three AC phases. In this case, a single neutral conductor wire is typically shared between three-phase circuits since little or no current flows in a balanced circuit, and the maximum current flowing in the neutral conductor is only the current of one phase circuit when the other two phases are off. It is also common for existing and new buildings to have wiring sized for the maximum current draw of older, inefficient lighting, or otherwise oversized wiring with respect to newer, energy efficient lighting.

In one embodiment, the shared neutral conductors of existing circuit branches for AC lighting are used as conductors for the DC bus 224. Particularly, the shared neutral conductors are used for branches of the DC bus 224 corresponding to the DC lighting 212. This embodiment has the advantage of allowing existing buildings with AC lighting to be easily retrofitted to utilize DC lighting, as well as allowing for the use of conventional and cost-effective AC wiring techniques in a new building designed to have DC lighting from the beginning.

Figure 3:
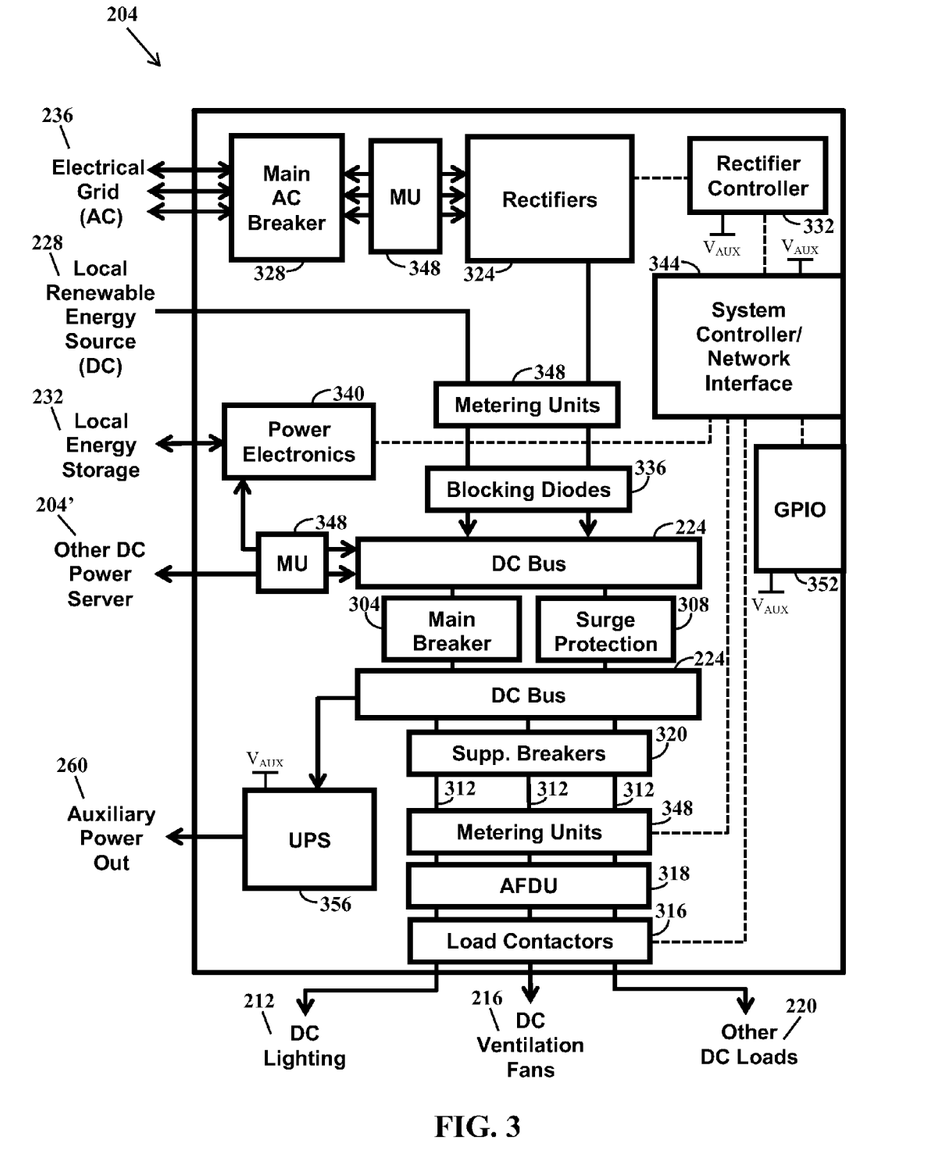
FIG. 3 illustrates an embodiment of a DC power server.

FIG. 3 shows a more detailed illustration of the DC power server 204. The DC power server 204 is configured to accept connections from the local renewable energy source 228, the local energy source 232, and the electrical grid 236. In some embodiments, the DC power server 204 is configured to accept connections from further energy sources. The DC power server 204 combines the energy sources at the DC bus 224. In some embodiments, the DC power server 204 includes a main breaker 304 and surge protection 308 along the DC bus 224 for over-current and over-voltage protection, respectively. The DC bus 224 has a plurality of branch circuits 312 that exit the DC power server 204 and distribute power to the DC loads of the DC microgrid 208, including the DC lighting 212, the DC ventilation fans 216, and the other DC loads 220. Load contactors 316 are configured along the branch circuits 312 to selectively disconnect the branch circuits 312 from the DC bus 224. In some embodiments, each of the branch circuits 312 have supplemental breakers 320 configured to provided additional over-current protection for each of the branch circuits 312. In some embodiments, each the branch circuits 312 have arc-fault detection units 318 configured to interrupt the branch circuit 312 if an arc-fault is detected.

The electrical grid 236 is integrated into the DC bus 224 via rectifiers 324. In some embodiments, the rectifiers 324 are a plurality of rectifier circuits operating in parallel to achieve a required power rating. In other embodiments, the rectifiers 324 are a single rectifier circuit. In further embodiments, the rectifiers 324 include redundant rectifier circuits for use if one of the rectifier circuits fails. In one embodiment, in the event of a failure of one rectifier circuit, the rectifiers 324 are configured to operate at partial capacity and the DC loads are configured to operate at the partial capacity, if necessary. In further embodiments, to enable peak efficiency of the rectifiers 324, the rectifiers 324 are configured to operate at a partial capacity depending on the amount of energy required from the electrical grid 236 by disabling one or more rectifier stage of the rectifiers 324. In some embodiments, a main AC breaker 328 is also provided for overcurrent protection on the input from them electrical grid 236. In some embodiments, the DC power server 204 includes a rectifier controller 332 for operating the rectifiers 324. A DC output of the rectifiers 324 is connected to the DC bus 224. In one embodiment, a DC output of the rectifiers 324 is connected to the DC bus 224 via blocking diodes 336. The blocking diodes 336 are configured to prevent current from flowing backward from the DC bus 224 to the rectifiers 324. In other embodiments, other types of reverse current protection are used.

The local renewable energy source 228 is directly integrated into DC bus 224. In one embodiment the local renewable energy source 228 is integrated into the DC bus 224 via the blocking diodes 336. The blocking diodes 336 prevent current from flowing backward from the DC bus 224 to the local renewable energy source 228.

The local energy storage 232 is integrated into the DC bus 224 directly. In some embodiments, the local energy storage 232 is integrated into the DC bus 224 via power electronics 340. The power electronics 340 are configured to convert voltages of the local energy storage 232 to the nominal voltage of the DC bus 224. In one embodiment, the power electronics 340 includes a buck converter for stepping down voltages and a boost converter for stepping up voltages. In one embodiment, the power electronics are further configured to control the charging and discharging of the local energy storage 232.

The DC power server 204 includes a system controller 344. The system controller 244 is configured to operate and interact with various components of the DC power server 204. The system controller is configured to operate the power electronics 340, the rectifier controller 332, and the load contactors 316. In one embodiment, the system controller 344 is configured to operate the power electronics 340, the rectifier controller 332, and the load contactors 316 autonomously. In one embodiment, the system controller 344 controls a master and slave relationship between one or more rectifiers of the rectifiers 324 and may change the relationship in real-time. Particularly, the system controller 344 controls which rectifiers are active and which rectifiers are redundant. In one embodiment, the master is in a voltage control mode and the slave is in a current control mode. In further embodiments, the system controller 344 is configured to relay commands from system controllers of other DC power servers or from the energy management gateway 240. Particularly, in one embodiment, the system controller 344 is configured to relay control commands from the energy management gateway 240 to the rectifiers 324 to. The system controller 344 includes a network interface for communicating with other DC power servers and the energy management gateway 240. In one embodiment, the network interface communicates with the energy management gateway 240 via Ethernet. In one embodiment, the network interface is a wireless communication device.

In one embodiment, the system controller 344 is configured to automatically disconnect the local renewable energy source 228 from the DC bus 224 when the DC loads are not present or in an off-state in which they do not draw power from the DC bus 224. This prevents the bus voltage of the DC bus 224 from reaching an open circuit voltage of the renewable energy source 228, which can damage other devices on the DC bus 224. In some embodiments, the rectifiers 324 additionally include inverter circuits that enable to rectifiers 324 to function as a bi-directional AC to DC and DC to AC converter. The rectifier controller 332 is configured to operate the rectifiers 324 as an inverter for exporting power from the DC bus 224 to the electrical grid 236. In one embodiment, the system controller 344 is configured to control the rectifier controller 332 to export power to the electrical grid 236 from the renewable energy source 228 when the DC loads are not present or in an off-state in which they do not draw power from the DC bus 224. In further embodiments, the system controller 344 is configured to control the rectifier controller 332 to export power to the electrical grid 236 from the renewable energy source 228 when the renewable energy source 228 is generating more power than is being drawn by the DC loads on the DC bus 224.

The DC power server 204 includes metering units 348. The metering units 348 are configured along the branch circuits 312 and along the energy source inputs to the DC bus 224 to monitor voltages and currents on the branch circuits 312. The metering units 348 are operably connected the system controller 344. The system controller 344 is configured to collect monitoring data from the metering units 348. In one embodiment, the system controller 344 is configured to transmit the monitoring data to the energy management gateway 240 or to system controllers of other DC power servers. In further embodiments, the system controller 344 is connected to a general-purpose input/output module (GPIO) 352. The system controller 344 is configured to transmit the monitoring data and other data to external devices via the GPIO 352, such as a laptop or tablet computer. In other embodiments, the functionalities of the system controller 344 and the GPIO 352 are accomplished by a single controller or some other configuration of controllers.

In some embodiments, the DC power server 204 includes an uninterruptible power supply (UPS) 356 for providing an auxiliary voltage $V_{AUX}$ to power to electronics within the DC power server 204, including the system controller 344, the rectifier controller 332, and the GPIO 352. The UPS 356 connected directly to the DC bus 224 and includes a DC/DC converter for converting the nominal voltage of the DC bus 224 to the auxiliary voltage $V_{AUX}$. The UPS 356 further includes energy storage for providing continued power to the electronics of the DC power server 204 in the event of a failure that causes the DC bus 224 to not be supplied with power. In some embodiments, the DC power server 204 includes an auxiliary power output 360 for providing the auxiliary voltage $V_{AUX}$ to external devices.

Figure 4:
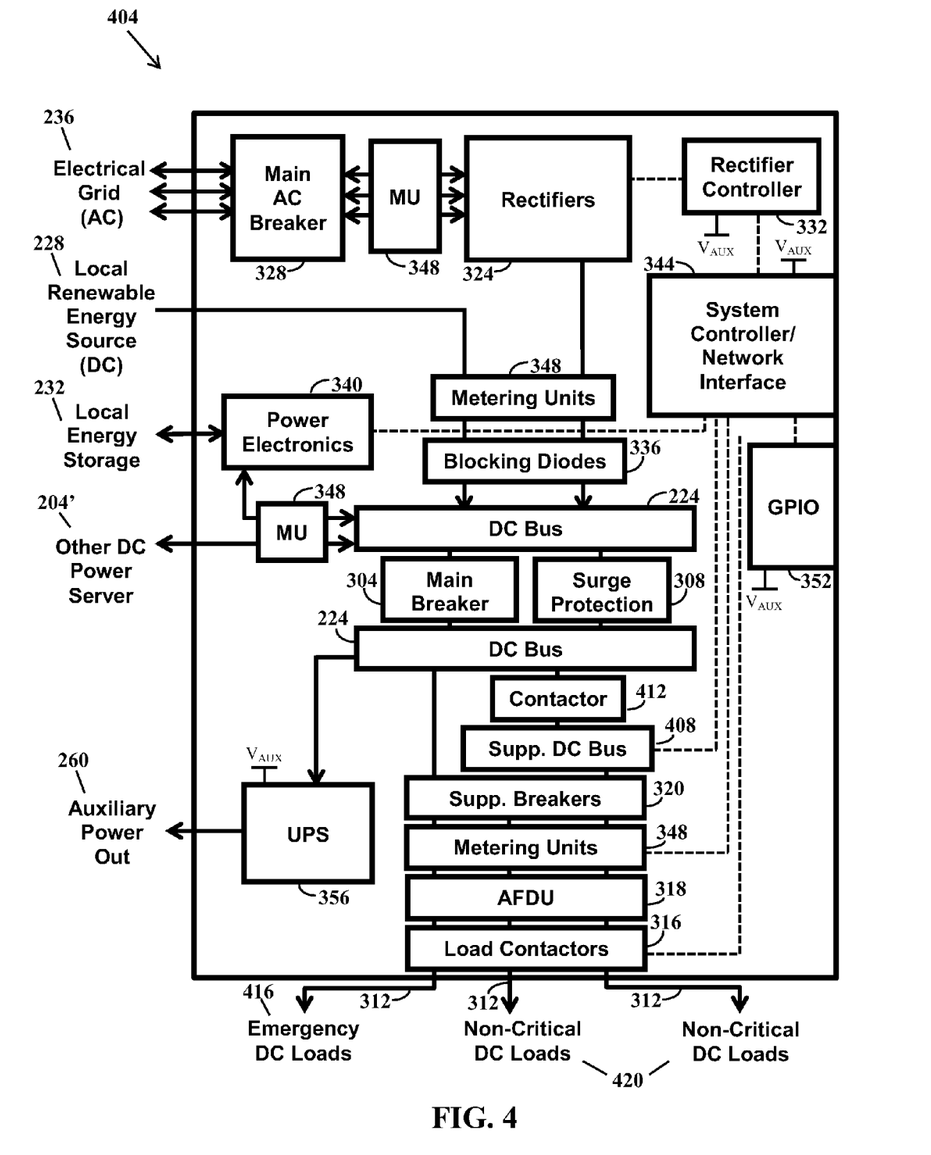
FIG. 4 illustrates a different embodiment of a DC power server for serving a DC microgrid having emergency loads.

FIG. 4 shows DC power server 404 which is similar to the DC power server 204. The DC power server 404 includes a supplemental DC bus 408 that is attached the DC bus 224 via a contactor 412 or other suitable device. Emergency DC loads 416 are connected directly to the DC bus 224 and non-critical DC loads 420 are connected to the supplemental DC bus 408. In one embodiment, the emergency DC loads 416 includes emergency DC lighting, but may include any other DC load considered an emergency load. The emergency DC lighting is either the same DC lighting system used in normal operation or a dedicated emergency lighting system. Branch circuits 312 extending from the supplemental DC bus 408 are routed through supplemental breakers 320, metering units 348, and load contactors 316, similar to the branch circuits 312 extending directly from the DC bus 224. In one embodiment, in the event of an outage on the electrical grid 236, system controller 344 is configured to disconnect the supplemental DC bus 408 by commanding the contactor 412 to open. When the supplemental DC bus 408 is disconnected from the DC bus 224, only the emergency DC loads 416 are provided with power. In other embodiments, during an outage on the electrical grid 236, the system controller 344 is configured to disconnect the supplemental DC bus 408 only if there is insufficient power provided from the local renewable energy source 228 and the local energy storage 232 to provide power both the emergency loads 416 and the non-critical DC loads 420.

In some embodiments, the DC power server 204 or 404 is configured as a wall-mountable or ceiling-mountable enclosure. The enclosure provides easy access to the main breaker 304 and supplemental breakers 320. The enclosure has a plurality of inputs and outputs and serves as a single connection point for local DC power sources, DC loads, AC sources, system controllers, metering devices, protective devices, and switching devices. In some embodiments, the cooling devices are included within the enclosure for cooling the rectifiers 324 and the power electronics 340. In other embodiments, the rectifiers 324 and the power electronics 340 are mounted to a surface of the DC power server 204 or 404, such that the enclosure acts as a heat sink.

Figure 5:
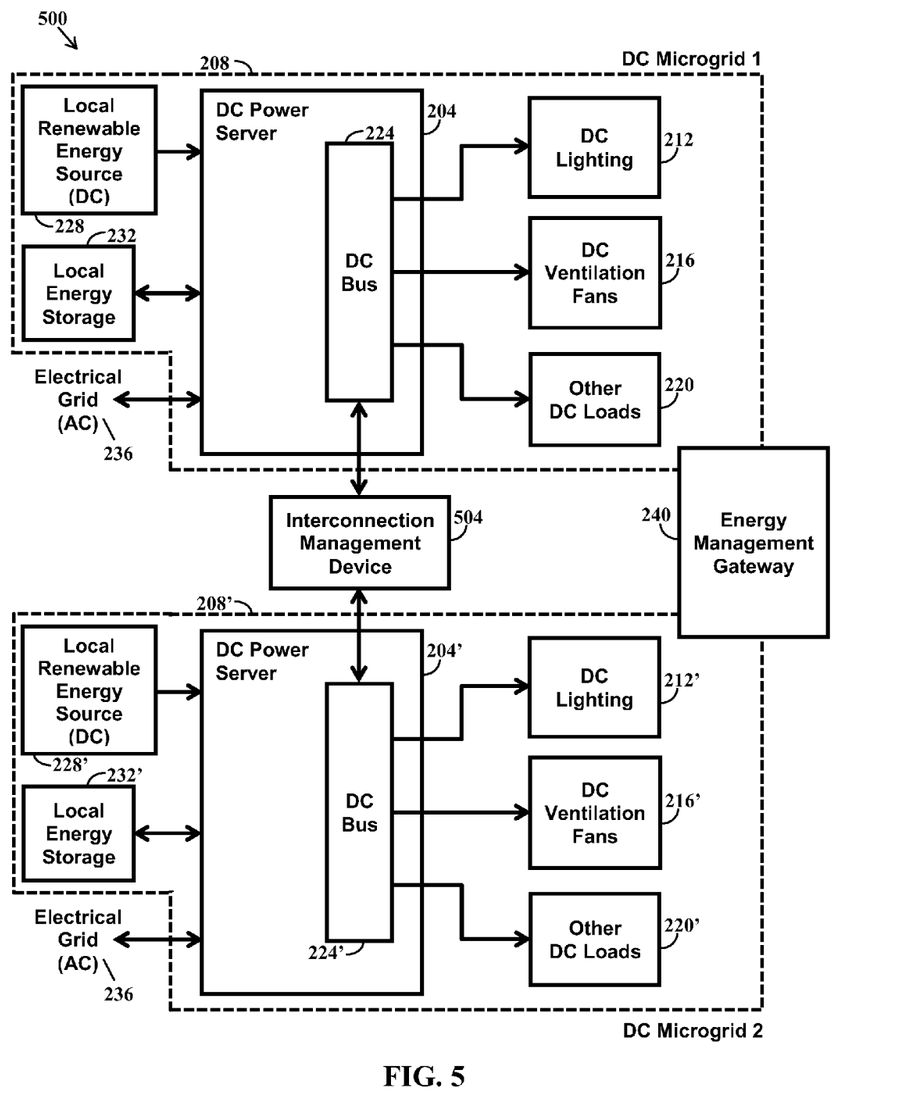
FIG. 5 illustrates a power distribution system having multiple DC microgrids.

In some embodiments, the DC power server 204 or 404 is configured to connect to another DC power server 204'. FIG. 5 shows a power distribution system 500 having two DC powers servers 204 and 204', which serve the DC microgrids 208 and 208', respectively. The system 500 has analogous components to the components of the system 200 and those analogous components are labeled with similar reference labels. In the system 500, the energy management gateway 240 is configured to monitor the status of the DC power servers 204 and 204' and to operate an interconnection management device 504 to selectively connect the DC bus 224 to the DC bus 224'.

In one embodiment, in the event of a complete or partial failure of one of the DC power servers 204 and 204', the energy management gateway 240 is configured to operate the interconnection management device 504 to connect the DC bus 224 with the DC bus 224'. In effect, the DC power server 204 or 204' can act to supply redundant power to the DC bus of the failed DC power server. By providing for redundancy in the event of a failure of a DC power server, the DC loads of the DC microgrid corresponding to the failed DC power server may continue to operate in at least a low power state. In one embodiment, in the event of a failure of one of the DC power servers, the system 500 is configured operate the DC lighting corresponding to the failed DC power server in a low power state to provide dimmed light.

In further embodiments, the energy management gateway 240 is configured to operate the interconnection management device 504 to selectively connect the DC bus 224 with the DC bus 224' for the purpose of load and source balancing across the DC busses. For example, in one embodiment, excess power from the local renewable energy source 228 or the local energy storage 232 is routed to the DC bus 224' so that DC loads on the DC bus 224' can utilize the excess power at a specific time, or vice versa.

In one embodiment, the interconnection management device 504 comprises a contactor configured to selectively interconnect the DC bus 224 with the DC bus 224'. In other embodiments, the interconnection management device 504 comprises other configurations of components such as relays, contactors, DC/DC converters, diodes, solid-state switches, resistors, and similar devices arranged to selectively interconnect the DC bus 224 and the DC bus 224'. In the embodiment shown in FIG. 5, the interconnection management device 504 exists separate from the DC power servers 204 and 204'. However, in some embodiments, similar interconnection management devices are incorporated into the enclosures DC power servers 204 and 204'. In further embodiments, similar interconnection management devices are configured between the energy source inputs of the DC power servers. In one embodiment, excess power from the local renewable energy source 228 or the local energy storage 232 is routed directly to the DC power server 204', or vice versa. In some embodiments, redundant existing AC wiring in a building can be used for retrofitting the building to include interconnection management devices.

Figure 6:
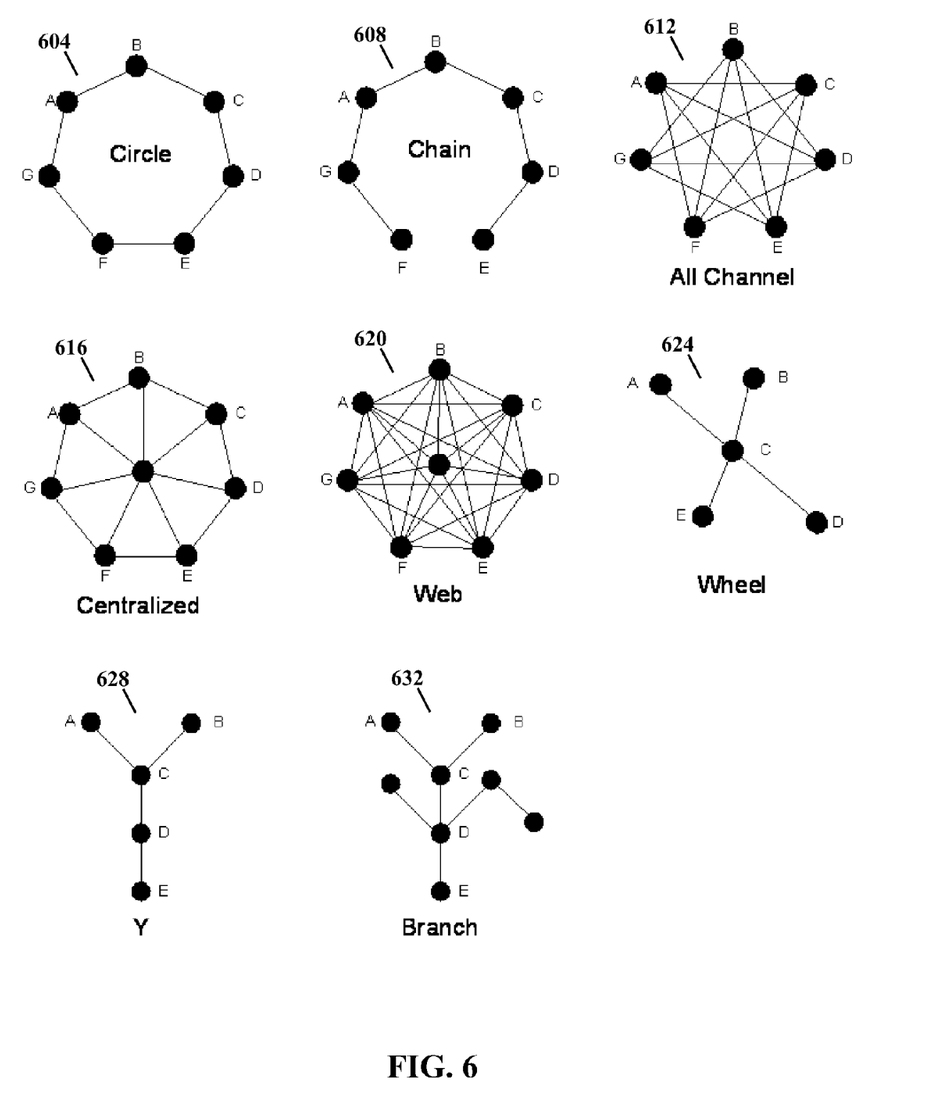
FIG. 6 illustrates redundancy configurations for a power distribution system having multiple DC microgrids.

In power distribution systems having several DC microgrids, the corresponding DC power servers A-G can be interconnected in a variety of configurations, shown in FIG. 6. In some embodiments, DC power servers A-G in are interconnected in one of the following configurations: a "Circle" configuration 604, a "Chain" configuration 608, an "All Channel" configuration 612, a "Centralized" configuration 616, a "Web" configuration 620, a "Wheel" configuration 624, a "Y" configuration 628, and a "Branch" configuration 632.

In some embodiments, one of the DC power servers in an interconnected multi-grid power distribution system acts as a master, and the other DC power servers act as slaves. In another embodiment, all of the DC power servers act as slaves and a network cloud or server acts as a master and commands the slave DC power servers.

The master DC power server or network cloud is configured to command an operating state of the slave DC power servers to optimize overall system operation and to ensure energy security. When acting as a slave, a DC power server takes direction from its master as to what operating mode it should assume. However, whether a DC power serve is in a master mode or a slave mode, each DC power server will always be able to make decisions and direct the operating state for its locally connected DC loads.

In some embodiments, each DC power server is configured to change its relationship within the system in real-time and switch from a master to a slave or vice versa as needed. In one embodiment, if a master DC power server goes down due to faulty component operation or other reasons, one of the slave DC power servers assume operation as the master.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A direct current power server for a building comprising:
an enclosure;
a direct current bus disposed within the enclosure, the direct current bus having at least one branch circuit that extends from the enclosure and connects with direct current loads of the building to provide direct current power to the direct current loads;
an electrical grid connection configured to connect to an electrical grid and to receive alternating current power from the electrical grid;
a rectifier circuit disposed within the enclosure and connected between the electrical grid connection and the direct current bus, the rectifier circuit being configured to provide direct current power to the direct current bus by converting the alternating current power from the electrical grid connection to direct current power;
an energy source connection configured to connect to an energy source and to receive direct current power from the energy source, the energy source connection being connected to the direct current bus to provide the direct current power from the energy source to the direct current bus;
a system controller configured to control power flow from the electrical grid and the energy source to the direct current bus; and
a uninterruptible power supply connected to the direct current bus and configured to provide power to the system controller, the uninterruptible power supply having a converter configured to convert a voltage of the direct current bus to a voltage of the system controller and energy storage configured to provide continued power to the system controller while the direct current bus is not providing power to the uninterruptible power supply.

2. The direct current power server of claim 1 further comprising:
an energy storage connection configured to connect to an energy storage device, to receive direct current power from the energy storage device, and to send direct current power to the energy storage device, the energy storage connection being connected to the direct current bus to provide the direct current power from the energy storage device to the direct current bus and to provide direct current power from the direct current bus to the energy storage device,
wherein the system controller is further configured to control power flow from the energy storage device to the direct current bus.

3. The direct current power server of claim 2 further comprising:
power electronics disposed within the enclosure and connected between the energy storage connection and the direct current bus, the power electronics being configured to control charging and discharging of the energy storage device and being operated by the system controller.

4. The direct current power server of claim 1, wherein the direct current bus has at least one branch circuit that extends from the enclosure and connects with direct current lighting of the building to provide direct current power to the direct current lighting.

5. The direct current power server of claim 4, wherein the system controller is configured to, in response to an operating condition of the direct current power server, operate the at least one branch circuit that connects with the direct current lighting to at least one of dim and flash the direct current lighting.

6. The direct current power server of claim 1, wherein the system controller is configured to, in response to an outage on the electrical grid, operate the direct current power server to provide direct current power from the energy source connection to the direct current bus.

7. The direct current power server of claim 1, wherein the system controller is configured to, in response to no power being drawn by the direct current loads from the direct current bus, disconnect the energy source connection from the direct current bus.

8. The direct current power server of claim 1 further comprising:
a rectifier controller disposed within the enclosure and operably connected to the rectifier circuit, the rectifier controller being configured to control a direct current output voltage of the rectifier circuit and being operated by the system controller.

9. The direct current power server of claim 8, wherein:
the rectifier circuit includes a plurality of rectifiers; and
the rectifier controller is configured to, in response to a failure of at least one of plurality of rectifiers, operate the rectifier circuit a partial capacity.

10. The direct current power server of claim 1, wherein:
the rectifier circuit includes an inverter circuit configured to convert direct current power from the direct current bus to alternating current power, and
the system controller is configured to, in response to no power being drawn by the direct current loads from the direct current bus, operate the rectifier circuit with the rectifier controller to export power from the direct current bus to the electrical grid.

11. The direct current power server of claim 1, wherein:
the rectifier circuit includes an inverter circuit configured to convert direct current power from the direct current bus to alternating current power, and
the system controller is configured to, in response to the energy source providing more power to the direct current bus than is being drawn by the direct current loads from the direct current bus, operate rectifier circuit with the rectifier controller to export power from the direct current bus to the electrical grid.

12. The direct current power server of claim 1, wherein the system controller is configured to autonomously control power flow from electrical grid and the energy source to the direct current bus.

13. The direct current power server of claim 1, wherein the system controller is configured to control power flow from electrical grid and the energy source to the direct current bus based on commands from at least one of (i) a system controller of a different direct current power server, and (ii) an energy management gateway.

14. The direct current power server of claim 1 further comprising:
a supplemental direct current bus disposed within the enclosure, the supplemental direct current bus being connected to the direct current bus via a switch and having at least one branch circuit that extends from the enclosure and connects with a first group of direct current loads of the building to provide direct current power to the first group direct current loads,
wherein the direct current bus has at least one branch circuit that extends from the enclosure and connects with a second group of direct current loads of the building to provide direct current power to the second group direct current loads, the second group of direct current loads being different than the first group of direct current loads.

15. The direct current power server of claim 14, wherein the system controller is configured to, in response to an outage on the electrical grid, operate the switch to disconnect the supplemental direct current bus from the direct current bus.

16. The direct current power server of claim 1 further comprising:
a power server connection configured to connect to a second direct current power server and to receive direct current power from the second direct current power server, the power server connection being connected to the direct current bus to provide the direct current power from the second direct current power server to the direct current bus.

17. A power distribution system for a building comprising:
a first energy source;
a first group of direct current loads of the building; and
a first direct current power server connected to the first energy source and the first group of direct current loads, the first direct current power server comprising:
a first enclosure;
a first direct current bus disposed within the first enclosure, the first direct current bus having at least one branch circuit that extends from the first enclosure and connects with the first group of direct current loads to provide direct current power to the first group of direct current loads;

a first electrical grid connection configured to connect to an electrical grid and to receive alternating current power from the electrical grid;

a first rectifier circuit disposed within the first enclosure and connected between the first electrical grid connection and the first direct current bus, the first rectifier circuit being configured to provide direct current power to the first direct current bus by converting the alternating current power from the first electrical grid connection to direct current power;

a first energy source connection configured to connect to the first energy source and to receive direct current power from the first energy source, the first energy source connection being connected to the first direct current bus to provide the direct current power from the first energy source to the first direct current bus; and a first system controller configured to control power flow from the electrical grid and the first energy source to the first direct current bus;

a second group of direct current loads of the building;

a second direct current power server connected to the second group of direct current loads, the second direct current power server comprising:

a second enclosure;

a second direct current bus disposed within the second enclosure, the second direct current bus having at least one branch circuit that extends from the second enclosure and connects with the second group of direct current loads to provide direct current power to the second group of direct current loads;

a second electrical grid connection configured to connect to the electrical grid and to receive alternating current power from the electrical grid;

a second rectifier circuit disposed within the second enclosure and connected between the second electrical grid connection and the second direct current bus, the second rectifier circuit being configured to provide direct current power to the second direct current bus by converting the alternating current power from the second electrical grid connection to direct current power; and an interconnection device configured to selectively connect the first direct current bus of the first direct current power server to the second direct current bus of the second direct current power server, wherein the interconnection device is configured to, in response to a failure of one of the first direct current power server and the second direct current power server, connect the first direct current bus of the first direct current power server to the second direct current bus of the second direct current power server.

18. A direct current power server for a building comprising:

an enclosure;

a direct current bus disposed within the enclosure, the direct current bus having at least one branch circuit that extends from the enclosure and connects with direct current loads of the building to provide direct current power to the direct current loads;

an electrical grid connection configured to connect to an electrical grid and to receive alternating current power from the electrical grid;

a power server connection configured to connect to another direct current power server and to receive direct current power from the other direct current power server, the power server connection being connected to the direct current bus to provide the direct current power from the other direct current power server to the direct current bus;

a rectifier circuit disposed within the enclosure and connected between the electrical grid connection and the direct current bus, the rectifier circuit being configured to provide direct current power to the direct current bus by converting the alternating current power from the electrical grid connection to direct current power;

an energy source connection configured to connect to an energy source and to receive direct current power from the energy source, the energy source connection being connected to the direct current bus to provide the direct current power from the energy source to the direct current bus; and a system controller configured to control power flow from the electrical grid and the energy source to the direct current bus.

19. The direct current power server of claim 18 further comprising:

a supplemental direct current bus disposed within the enclosure, the supplemental direct current bus being connected to the direct current bus via a switch and having at least one branch circuit that extends from the enclosure and connects with a first group of direct current loads of the building to provide direct current power to the first group direct current loads, wherein the direct current bus has at least one branch circuit that extends from the enclosure and connects with a second group of direct current loads of the building to provide direct current power to the second group direct current loads, the second group of direct current loads being different than the first group of direct current loads.

20. The direct current power server of claim 19, wherein the system controller is configured to, in response to an outage on the electrical grid, operate the switch to disconnect the supplemental direct current bus from the direct current bus.

* * * * *